3,842,132
DEHYDROGENATION OF OLEFINIC HYDROCARBONS
Ching-Tsan Lo, Joe Jed Miller, and Norbert Francis Cywinski, Odessa, Tex., assignors to El Paso Products Company, Odessa, Tex.
No Drawing. Filed Apr. 9, 1973, Ser. No. 349,327
Int. Cl. C07c 5/18
U.S. Cl. 260—669 R                12 Claims

ABSTRACT OF THE DISCLOSURE

A process for the dehydrogenation of olefinic hydrocarbons to form olefins and diolefins, comprising the steps of contacting said olefinic hydrocarbons with a dehydrogenation catalyst consisting essentially of a vanadate of a Group IV–A and/or V–A metal optionally promoted by a compound of Group V–B, VI–B or VIII of the Periodic Table of the Elements.

BACKGROUND OF THE INVENTION

Field of the Invention

This invention relates to an improved process for the dehydrogenation of olefinic hydrocarbons and alkylaromatics to form olefins and/or diolefins. More particularly, this invention concerns the use of a novel dehydrogenation catalyst for improving the conversion of the dehydrogenation process and the selective recovery of olefins and/or diolefins.

Description of the Prior Art

It is known in the art to effect the dehydrogenation of olefinic hydrocarbons to form olefins and diolefins by reaction of the olefinic hydrocarbon feed under dehydrogenation conditions in the presence of a catalyst. However, such processes are usually conducted in the presence of oxygen or under oxidative dehydrogenation conditions as normal dehydrogenation requires such severe conditions and generates such a large volume of hydrogen gas that it has not been an attractive procedure commercially. A typical oxidative dehydrogenation process of this type is disclosed in U.S. Pat. 3,050,572 which conducts the process in the presence of a powdered oxidant comprising primarily $Fe_2O_3$.

U.S. Pat. No. 3,446,869 to Nolan teaches a similar oxidative dehydrogenative process wherein the dehydrogenation of olefins is carried out in the presence of a catalyst comprising lead molybdate and aluminum tungstate and/or cobalt tungstate and in the presence of a stream of oxygen gas. However, the use of the oxygen stream causes additional problems in conducting the process. Thus, when oxygen is added to the system as air (e.g. as in Pat. 3,161,670), the 80% nitrogen component of the air greatly increases the load on the compressor units. Moreover, the amount of oxygen gas present as oxidant must be controlled so that the hydrogen and oxygen gases do not become major components in the mixture of hydrocarbon reactants.

A substantial improvement on these various prior art procedures is to be found in U.S. Pat. No. 3,488,402 to Michaels et al., issued in 1970. In this patent there is disclosed a process whereby aliphatic chain-containing hydrocarbons, e.g. alkanes and/or alkenes, are dehydrogenated to olefins and/or diolefins utilizing a two-step procedure. In the first step of this procedure, the starting alkanes and/or alkenes are contacted with a dehydrogenation catalyst such as chromia-alumina at a temperature of 900 to 1200° F. and a pressure of 0.1 to 0.8 atmosphere. The second step of this procedure comprises contact of the products from the first step with a reducible oxidation catalyst comprising the vanadates, molybdates, phosphomolybdates, tungstates and phosphotungstates of the Group IV–A and V–A metals. An exemplary catalyst of this type is bismuth vanadate. This second step is carried out under conditions similar to the first step. According to the patent, the second step catalyst is a reducible oxidation catalyst which improves the selectivity of the process by supplying oxygen to the reaction to aid in the conversion of the evolved hydrogen to water. The improved results realized from this two-step system are said to be an increased carbon to hydrogen ratio and an improvement in the recovery of the olefins and/or diolefins.

The present invention represents an improvement over these prior processes. Thus, according to this invention, it has been discovered that the dehydrogenation of alkenes and alkylaromatics to form olefins and/or diolefins can be effected in the presence of a catalyst system comprising the vanadates of the Group IV–A and/or V–A metals optionally promoted by a compound of Group V–B, VI–B or VIII and in the absence of air or oxygen. Therefore, this invention represents an improvement over U.S. Pat. No. 3,488,402 in that it has been discovered that certain of the second step catalysts disclosed in this patent are effective as dehydrogenation catalysts under moderate conditions. This development is not disclosed in Pat. No. 3,488,402 as this patent merely uses the second step catalysts to remove the hydrogen by conversion to water. Therefore the present invention represents an advance in the art over these prior patents.

SUMMARY OF THE INVENTION

It is accordingly one object of the invention to provide a dehydrogenation process which overcomes or otherwise mitigates the problems of the prior art.

A further object of the invention is to provide a novel catalyst system and one-step method for the dehydrogenation of olefinic hydrocarbons including alkylaromatics to form olefins and diolefins using a promoted dehydrogenation catalyst and in the absence of added oxygen gas.

Other objects and advantages of the present invention will become apparent as the description proceeds.

In satisfaction of the foregoing objects and advantages, there is provided by this invention a one-step process for the dehydrogenation of olefinic hydrocarbons, including aromatics, to form olefins and diolefins by the steps comprising contacting said olefinic hydrocarbons with a dehydrogenation catalyst comprising a vanadate of a Group IV–A and/or V–A metal optionally promoted by a compound of Group V–B, VI–B or VIII of The Periodic Table of the Elements. The process includes the dehydrogenation of alkylaromatics and cycloalkenes such as ethyl benzene to form olefinically substituted aromatics such as styrene, using the dehydrogenation catalyst system.

DESCRIPTION OF PREFERRED EMBODIMENTS

The dehydrogenation process of the present invention involves the use of a particular catalyst and no air of free oxygen is added to this system. Thus, the use of this particular catalyst enables the obtaining of higher yields of olefins and diolefins per pass and the selectivity to desired products is increased in a single step procedure.

In the process of the present invention, the olefinic hydrocarbon feedstock is selectively converted to olefins and/or diolefins in good yield using a distinct catalyst system. The starting materials or olefinic hydrocarbons which are dehydrogenated by this process may be any olefinic hydrocarbon convertible to olefins and/or diolefins but preferably comprises alkenes ranging from four to about twenty or more carbon atoms, cycloalkenes or alkylaromatics, individually or in a mixture. The process of the invention is particularly suitable for the lower alkenes, that is, the $C_4$ through $C_6$ alkenes. Thus, suitable feeds can range from n-butene, n-pentene, isopentene, mixtures thereof and the like. There may also be employed cycloalkenes of 4 to 6 carbon atoms such as cyclobutene, cyclopentene and cyclohexene. The alkylaromatics which can be used contain 1 to 4, preferably 1 to 2, alkyl groups per molecule which themselves contain from 1 to 20, preferably 2 to 6, carbon atoms per group with at least one alkyl group having at least 2 carbon atoms. A highly preferred alkylaromatic compound starting material is ethylbenzene which dehydrogenates to styrene.

The products resulting from this process comprise unsaturated hydrocarbons such as butadiene, isoprene, styrene and the like. Particularly preferred processes include the production of butadienes from butenes, 1,3-pentadiene from pentenes, isoprene from 2-methylbutene and styrene from ethylbenzene. These final products are well known and in particular, find utility as monomers for known polymerization processes to prepare a wide variety of useful products.

The dehydrogenation process is conducted under an elevated temperature, for instance, about 700° to 1200° F., preferably about 950° to 1100° F. The pressure may vary from about 0.1 to about 250 p.s.i.a., preferably about 0.1 to 25 p.s.i.a. The contact time or liquid hourly space velocity (LHSV) which may be dependent upon the catalyst, temperature and pressure employed, will generally range from about 0.1 to 10 seconds or more, preferably about one fifth to five LHSV based on the liquid volume of hydrocarbon per volume of catalyst per hour. The dehydrogenation cycle time may vary from about one to thirty minutes, preferably five to twenty minutes.

As pointed out, the essential novelty of the process resides in the catalyst. Thus, the catalyst used in the method of the present invention to improve the conversion to olefins and/or diolefins comprises the vanadates of Group IV-A and/or V-A metals optionally promoted by a compound of Group V-B, VI-B and/or VIII of the Periodic Table of the Elements as presented at pages 392–393 of the "Handbook of Chemistry and Physics," 35th edition. Thus, the novel catalysts preferably comprise the vanadates of Group IV-A metals (germanium, tin or lead) or Group V-A metals (antimony or bismuth). In a most preferred embodiment the catalysts also contain a promoter which comprises a compound (e.g. the nitrate) or element of Group V-B (vanadium, niobium or tantalum), Group IV-B (chromium, molybdenum or tungsten), or Group VIII (iron, cobalt, nickel, ruthenium, rhodium, palladium, osmium, iridium or platinum). The most preferred catalyst within this broad grouping is bismuth vanadate which may be promoted by palladium, platinum and/or chromium. Catalyst mixtures may also be used.

In the catalyst, the atomic ratio of the vanadium metal content to the Group IV-A and/or Group V-A metal content should be in the range of 0.05 to 50, preferably 0.2 to 10. If present, the promoter (Group V-B, and VI-B and/or Group VIII) content should be in the range of 0.02 to 50 weight percent, preferably, 0.1 to 20 of the base catalyst. The base catalyst can be employed with or without a supporter, but if a supporter is used, alumina, magnesia, silica and the like are satisfactory. Any support used should not be deleterious to the dehydrogenation reaction. The amount of support used can be that which depends on the convenience of the process. Usually the amount of supporter ranges from 30% to 80% by weight of total catalyst.

The catalyst is prepared by reacting a Group IV-A or Group V-A metal salt, such as the nitrate, in an aqueous mineral acid solution and contacting with the requisite amount of vanadate and profoter if used at a temperature of about 150–200° F. In a highly preferred procedure, the Group IV-A or Group V-A metal salt is dissolved in a strong mineral acid solution and then added slowly to an agitated suspension of the promoter compound and an oxide of vanadium at 150–200° F. Thereafter, the mixture is neutralized to a pH of about 7.0 to 8.0, preferably 7.5, by addition of a base such as aqueous ammonia. The slurry is then filtered, washed and dried. The recovered dried catalyst is then pelleted to the desired size or mesh.

The following examples are presented to illustrate the invention but is not to be considered as limited thereto. In the examples and throughout this specification, parts are by weight unless otherwise indicated.

EXAMPLE I

A non-promoted catalyst was prepared by dissolving 117 grams of $Bi_2O_3$ in 500 ml. of dilute nitric acid (140 ml. of concentrated $HNO_3$+360 ml. of water), and stirring 46 grams of vanadium pentoxide in 500 ml. of deionized water. The bismuth oxide solution was added to the stirred suspension of the vanadium pentoxide. The temperature of the suspension was maintained at about 160 to 170° F. during the addition. The mixture was then neutralized to a pH of 7.5 by adding aqueous ammonia and then filtered and washed. The washed Bi-V was slurried with 200 grams of Kaiser hydrated alumina (30% $H_2O$). The slurry was dried and pelleted to ¼" size. In this catalyst, the atomic ratio of bismuth:vanadium:aluminum was about 2:2:11. To test this catalyst, 127 grams (100 ml.) of the prepared catalyst was charged to a reactor. The reactor was used for the dehydrogenation of butenes and ethylbenzene at atmospheric pressure. The partial pressure of the hydrocarbons was reduced by dilution with four volumes of nitrogen. The liquid hourly space velocity was 0.45 (hydrocarbons only). The results of the dehydrogenation of butene-2 at 500° C. were as follows (the sample being taken at five minutes after butene-2 was fed).

TABLE I (Feed: butene-2)

Conversion mol percent _____ 43.4
Selectivity mol percent _____ 89.33

The results of the dehydrogenation of ethylbenzene at 500° C. were as follows (the sample was taken at 20 minutes after ethylbenzene was fed).

TABLE II (Feed: ethylbenzene)

Conversion mol percent _____ 65.32
Selectivity mol percent _____ 91.14

In the dehydrogenation of ethylbenzene, 77% of byproducts was benzene which can be recycled to ethylbenzene production.

EXAMPLE II 140 grams of the Bi-V-Al catalyst prepared in the method of Example I was slurried by adding 45 grams of

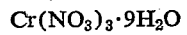
$Cr(NO_3)_3 \cdot 9H_2O$ in 100 ml. of deionized water. The slurry was dried in a vacuum oven and then pelleted. In this catalyst, the atomic ratio of chromium:bismuth:vanadium:aluminum was about 1:2:2:11.

To test this catalyst, 134 grams (100 ml.) of the prepared catalyst was charged to a reactor in the same manner as Example I. The reactor was used for the dehydrogenation of butenes and ethylbenzene at atmospheric pressure. The partial pressure of the hydrocarbons was reduced by dilution with four volumes of nitrogen. The liquid hourly space velocity was 0.45 (hydrocarbons only). The results of the hydrogenation of butene-2 at 500° C. were as follows (the sample being taken at five minutes after butene-2 was fed).

TABLE III (Feed: butene-2)

Conversion mol percent _____ 74.84
Selectivity mol percent _____ 84.56

The results of the dehydrogenation of ethylbenzene at 500° C. were as follows (the sample was taken at 20 minutes after ethylbenzene was fed).

TABLE IV (Feed: ethylbenzene)

Conversion mol percent _____ 81.71
Selectivity mol percent _____ 77.87

In the dehydrogenation of ethylbenzene, 93% of by-products was benzene which can recycled to ethylbenzene production.

A comparison of Examples I and II shows that the bismuth vanadate catalyst supported on alumina is good for the dehydrogenations and further that the catalyst promoted by chromium is more active.

The invention has been described herein with reference to certain preferred embodiments; however, as obvious variations will become apparent to those skilled in the art, the invention is not to be considered as limited thereto.

What is claimed is:

1. A method for the dehydrogenation of olefinic hydrocarbons to form olefins and/or diolefins without the addition of air or oxygen comprising contacting said olefinic hydrocarbons with a dehydrogenation catalyst comprising a vanadate of a Group IV-A and/or V-A metal optionally promoted by a compound of Group V-B, VI-B, or VIII of the Periodic Table of the Elements.

2. A method according to claim 1 wherein the olefinic hydrocarbon starting material is an alkene containing 4 to about 20 carbon atoms, a cycloalkene of 4 to 6 carbon atoms or an alkylaromatic hydrocarbon containing 1 to 4 alkyl groups in the molecule which in themselves contain 1 to 4 carbon atoms in the alkyl chain and at least 1 alkyl group contains at least 2 carbon atoms.

3. A method according to claim 2 wherein the dehydrogenation catalyst has an atomic ratio of a vanadium content to the Group IV-A and/or Group V-A metal content in the range of 0.05 to 50.

4. A method according to claim 3 wherein the catalyst contains a promoter in a content in the range of about 0.02 to about 50 weight percent of the basic catalyst.

5. A method according to claim 4 wherein the dehydrogenation reaction is conducted at a temperature of about 700 to 1200° F., and a pressure of from 0.1 up to 250 p.s.i.a.

6. A method according to claim 5 wherein contact of the olefinic hydrocarbon with the catalyst ranges from 0.1 to 10 seconds.

7. A method according to claim 6 wherein the catalyst is a vanadate of germanium, tin, lead, antimony or bismuth.

8. A method according to claim 7 wherein the vanadate catalyst is promoted by a compound of niobium, tantalum, chromium, molybdenum, tungsten, iron, cobalt, nickel, ruthenium, rhodium, palladium, osmium, iridium or platinum.

9. A method according to claim 8 wherein the atomic ratio of vanadium content to germanium, tin, lead, antimony or bismuth content is about 0.2 to 5.

10. A method according to claim 9 wherein the catalyst is a vanadate of bismuth, antimony and/or tin promoted by a compound of chromium, palladium and/or platinum.

11. A method according to claim 10 wherein the olefin feed is butene, pentene, isopentene, hexene, ethylbenzene, cyclobutene, cyclopentene, cyclohexene or mixture thereof.

12. A method according to claim 10 wherein the catalyst is contained on a support.

References Cited
UNITED STATES PATENTS

| | | | |
|---|---|---|---|
| 2,326,258 | 8/1943 | Schmidt et al. | 260—680 E |
| 2,488,402 | 1/1970 | Michaels et al. | 260—680 R |
| 3,336,408 | 8/1967 | Capp et al. | 260—669 R |
| 3,492,248 | 1/1970 | Notari et al. | 260—680 E |

FOREIGN PATENTS

| | | | |
|---|---|---|---|
| 1,418,767 | 12/1970 | West Germany | 260—680 E |

CURTIS R. DAVIS, Primary Examiner

U.S. Cl. X.R.

260—680 R, 680 E